United States Patent [19]

Mack et al.

[11] 4,428,107
[45] Jan. 31, 1984

[54] PROCESS FOR FILLING WITH A HARDENABLE FILLER GAPS WHERE CORROSIVE ATTACK CAN OCCUR IN TUBE AND FIN HEAT EXCHANGERS

[75] Inventors: Karl Mack, Singen, Fed. Rep. of Germany; Zdenek Maly, Kreuzlingen, Switzerland

[73] Assignee: Swiss Aluminium Ltd., Chippis, Switzerland

[21] Appl. No.: 363,893

[22] Filed: Mar. 31, 1982

Related U.S. Application Data

[62] Division of Ser. No. 115,088, Jan. 24, 1980, Pat. No. 4,342,150.

[30] Foreign Application Priority Data

Feb. 1, 1979 [CH] Switzerland .................... 1001/79

[51] Int. Cl.³ .................... B21D 53/00; B21K 29/00; B23P 15/26; B05D 7/22
[52] U.S. Cl. .................... 29/157.3 A; 29/157.3 B; 29/157.4; 427/238
[58] Field of Search .................... 427/231, 238; 29/157.3 A, 157.3 B, 157.4, 527.1, 469.5, 458, 460

[56] References Cited

U.S. PATENT DOCUMENTS

| | | | |
|---|---|---|---|
| 1,742,321 | 1/1930 | Rogers | 29/726 |
| 3,307,996 | 3/1967 | Keneipp, Jr. | 427/238 |
| 3,322,559 | 5/1967 | Eskijian | 427/238 |
| 4,041,599 | 8/1977 | Smith | 29/458 |
| 4,180,601 | 12/1979 | Kopis | 427/238 |

Primary Examiner—Howard N. Goldberg
Assistant Examiner—Steven Nichols
Attorney, Agent, or Firm—Bachman and LaPointe

[57] ABSTRACT

To fill up the ring-shaped gaps between the tubes and fins of a tube and fin type heat exchanger with a corrosion protective hardenable filler, a unit made up of two closing pieces with filler material between them is pushed by means of the tube to be inserted in the stacked fins through the space formed by the collars of the openings in the fins which are stacked together for assembly into a heat exchanger. On passing this unit through the stacked fins the ring-shaped gaps are filled up with the filler material. The remaining thin film on the collars is also forced into the ring-shaped gaps when the tubes are subsequently expanded. A device for carrying out the process comprises a sleeve with a mandrel which slides inside the sleeve and forms a seal with the sleeve and a piston which likewise slides in the sleeve and forms a seal therewith and which lies ahead of the mandrel forming a space which can be varied in size and which accommodates the filler material. This device is positioned at and in line with a cylindrical space formed by the collars of the stack of fin material and the unit comprising the piston and mandrel with filler material between them is pushed out of the sleeve and through the cylindrical space formed by the stacked batch of fins.

7 Claims, 6 Drawing Figures

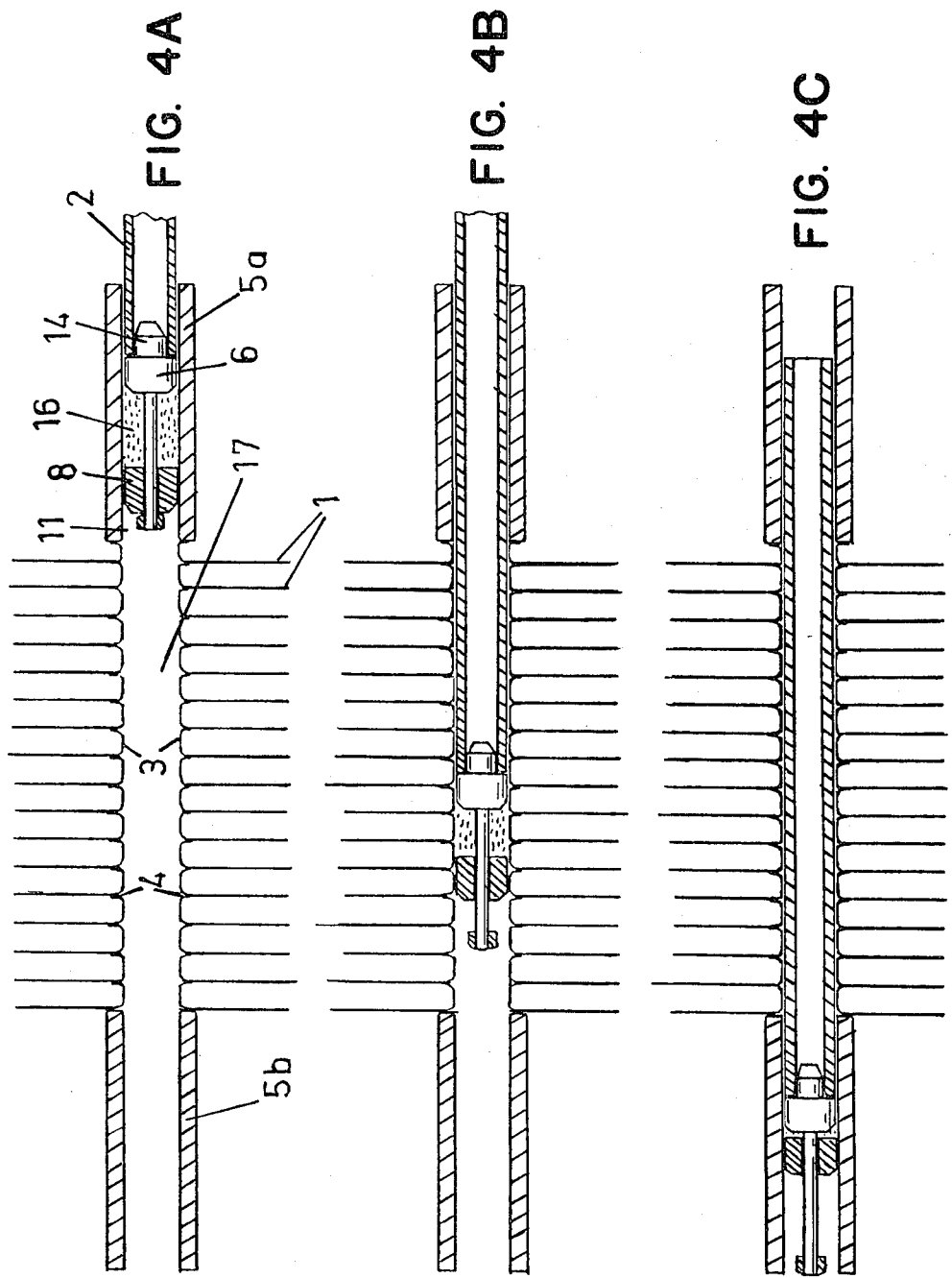

PROCESS FOR FILLING WITH A HARDENABLE FILLER GAPS WHERE CORROSIVE ATTACK CAN OCCUR IN TUBE AND FIN HEAT EXCHANGERS

This is a division of application Ser. No. 115,088, filed Jan. 24, 1980, now Pat. No. 4,342,150.

BACKGROUND OF THE INVENTION

The present invention relates to a process and device for filling, with a corrosion protective hardenable filler material, the ring-shaped gaps which form between the tubes and fins on assembling tube and fin type heat exchangers.

A so-called tube and fin type heat exchanger is commonly used for liquid-to-gas or gas-to-liquid heat transfer. This kind of equipment is used mostly for transferring heat from a liquid to the air, (for cooling liquids or heating the air), or from the air to a liquid, (air conditioners, evaporators). To compensate for the poor heat transfer to the air, the tubes carrying the liquid in such heat exchangers are fitted with so-called fins or lamellae on the outside to increase the heat emitting surface in contact with the air.

There are various ways of manufacturing such heat exchangers. One design which is produced widely employs small disc-shaped fins made of sheet material stacked in series on centrally positioned tubes. Particularly suitable for this purpose are sheet materials which exhibit high thermal conductivity as this allows the fins to be relatively thin. In the case of one well known design the individual fins of a plurality of tubes are in the form of thin sheets i.e. lamellae or fins penetrated by a plurality of tubes. These lamellae which have a large surface area are provided with a number of openings or holes corresponding to the number of tubes. This way a compact heat exchanger can be made up of tubes and lamellae.

The quality of the join between the lamellae, or fins as they are usually called, and the tubes carrying the fluid is extremely important as the conduction of heat into the fins and therefore the efficiency of the heat exchanger depends on this.

A proven method of joining tube and fin, and one which is used often as it is suitable for large scale production, is clamping such that a so-called integral collar which is formed out of the fin itself surrounds the tube. This collar serves, at the same time, to conduct heat into the fin and to fix exactly the space between that fin and the next one. The tight fit of the collar onto the tube is achieved by expanding the tube after the assembly of the heat exchanger.

A ring-shaped gap forms at the place of contact between one fin and the flanged integral collar of the next fin. This is unavoidable as it is impossible to reduce the radius of the bent-over edge of the collar to such an extent that a sharp edge is produced.

Under unfavorable atmospheric conditions moisture can penetrate this ring-shaped gap, and substances which promote corrosion can gather there. Such conditions favor crevice corrosion in the relatively small gaps. This, as is well known, can result in intensive corrosive attack of the tubes and the fins. The localized attack due to crevice corrosion can in time lead to perforation of the tube, which practically amounts to destruction of the heat exchanger.

There are various known methods for protecting heat exchangers from this kind of corrosion. The tubes and the fins can be coated with a metallic cladding, be provided with oxide layers by chemical processes or by anodizing, or they can be given an organic protective coating. The costs involved with these processes are however considerable and in general lead to a marked increase in the cost of producing such units. In the case of organic coatings, because of the reduced thermal conductivity, these present a barrier to heat transfer from the tube to the fin. Consequently, even a relatively thin layer results in a significant reduction in the efficiency of the heat exchanger. This then has to be compensated for by a corresponding increase in the surface area of the fins.

The disadvantage of poor heat transfer can be avoided by coating the tubes with a layer of substance which is still fluid or viscous during assembly of the heat exchanger. However, this results in a new difficulty in that, on inserting the tube, the coating material at the openings in the fins is wiped away in the direction of insertion. Consequently, the complete filling of all ring-shaped gaps, which is absolutely necessary for effective corrosion protection (especially in heat exchangers with long tubes), is not assured.

It is therefore an object of the present invention to develop a process and device which allow the ring-shaped gaps to be filled in a simple manner with a corrosion protective mass without impairing the heat transfer between pipe and fins. The process and the device should also be applicable for the assembly of heat exchangers using long tubes.

SUMMARY OF THE INVENTION

The foregoing object is achieved by way of the present invention wherein (a) a fluid filler is introduced into a cylindrical space between two closing pieces which can be displaced by sliding and which form seals against the walls of the cylindrical space, the cylindrical space having the same diameter as the cylindrical hollow spaces formed by the collars of the lamellae or fins stacked to form a unit to be assembled into a heat exchanger;

(b) the cylindrical space with the unit made up of the two closing pieces with filler material between them is lined up with the stack of fins such that the axis of this cylindrical space coincides with the axis of a cylindrical space formed by the collars of the stacked fins;

(c) the unit made up of the two closing pieces with the filler mass between them is pushed through and out of the cylindrical space in the stacked fins by the tube to be inserted in that space, and (d) the tube is subsequently widened.

By pushing the unit, made up of the two closing pieces with filler between them, through the cylindrical space in the stacked fins, the closing piece ahead of the filler material exercises a certain pressure on the filler with the result that the filler is forced uniformly into the ring-shaped gaps as the unit is pushed through. The following closing piece causes the filler material to be wiped off the collars leaving only a thin film behind.

In a preferred version of the process the unit of two closing pieces with the filler means between them is pushed into a cylindrical space on the other side of the stack of fins after being pushed through the cylindrical space in the stack of fins. After the tube has been pushed through the fins, the unit with unused filler is then again in a cylindrical space and, after being charged with new filler, is again ready for use.

There is no problem assembling heat exchangers with longer tubes, a correspondingly larger amount of filler material is needed.

On widening the tube after it has been inserted into the stack of fins the thin film of filler remaining on the collars of the fins is forced into the ring-shaped gaps. The filler in these gaps provides protection against corrosion and also helps ensure that the clamped connection between the tubes and the fins does not become loose.

Suitable fillers are plastics which harden by heating or by mixing two components. In the case of a thermally hardening filler the whole heat exchanger is given the necessary heat treatment in an oven. If the heat exchanger is to be given a coating of lacquer, the stoving of the lacquer and the hardening of the filler can be carried out in one step.

The device of the present invention for carrying out the process comprises:

(a) a body with at least one cylindrical space of the same diameter as the cylindrical spaces formed by the collars in the fins or lamellae which are stacked to be assembled into a heat exchanger, (b) a mandrel which can slide in the cylindrical space in said body and is such that it forms a seal against the wall of the cylindrical space, and (c) a piston which can slide in the cylindrical space in said body and forms a seal against the wall of the cylindrical space, the said piston being positioned in front of the mandrel forming a space of variable volume to accommodate the filler material.

In an advantageous version of the device in accordance with the present invention the mandrel is provided with a shaft lying in the axis of the cylindrical space. The piston can slide on this shaft and is set on this forming a seal with it.

A stop can be provided at the end of the shaft to which the piston runs, to prevent it sliding off.

The filler can be introduced into the space formed between mandrel and piston via a hole through the mandrel, the hole preferably being fitted with a non-return valve. A further possibility is to introduce the filler through a hole in the body, the hole again preferably being fitted with a non-return valve.

The piston is usefully fitted with a piston ring to ensure better sealing against the wall of the cylindrical space formed by the collars of the openings in the stacked fins, and to adjust the resistance to displacement of the piston to achieve a certain pressure on the filler material. A good degree of sealing can also be achieved by fitting the piston with a rubber or leather sleeve.

The piston at the leading end of the mandrel can be conical to make it easier to pass through the cylindrical space in the stacked fins, and can be fitted with a stop at the end.

The body which has to accommodate the unit comprising piston, mandrel and the filler material between them can be in the form of a sleeve. For large series production of heat exchangers however, it is advantageous to employ a block which is provided with holes corresponding in number and position to the cylindrical spaces in the stack of fins.

When assembling a heat exchanger, the set of stacked fins can be fixed between two such blocks, which can be used at the same time as pressure plates to apply a preliminary pressure to the set of fins. Large series, mechanized assembly of heat exchangers is then achieved by the simultaneous introduction of filler material in the device of the invention present in each of the holes in the said block. After all the tubes have been pushed through the set of fins, the devices of the invention are then in the holes in the second block. After being filled with fresh filler material, they are again ready for use.

BRIEF DESCRIPTION OF THE DRAWINGS

The invention will now be explained in greater detail with the help of schematic drawings wherein

FIGS. 4a–c: Shows the mode of operation of a device in accordance with the invention.

DETAILED DESCRIPTION

Figure 1:
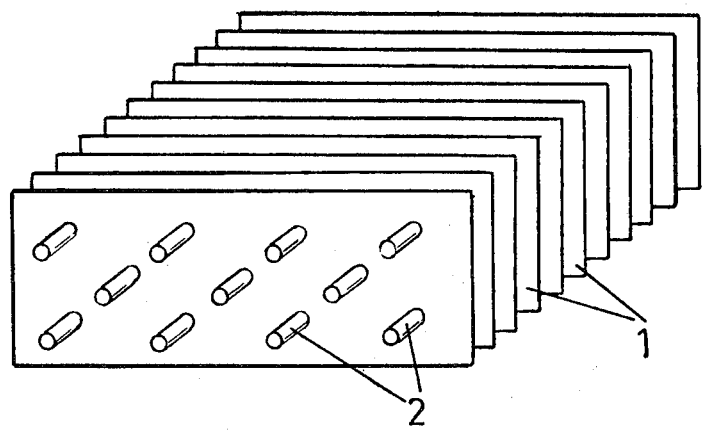
FIG. 1: Is a perspective view of a part of a tube fin type heat exchanger.
Figure 2:
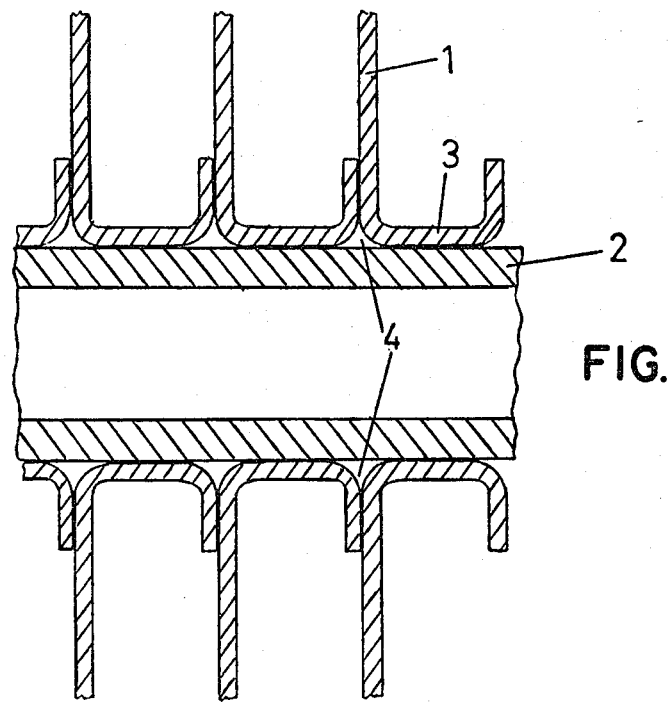
FIG. 2: Is a longitudinal view through part of a tube in a tube and fin type heat exchanger.

On assembling a tube and fin type heat exchanger, as shown schematically in FIG. 1, small, ring-shaped gaps 4 such as are seen in FIG. 2 are formed between the collars 3 of the fins 1 and the tubes 2.

Figure 3:
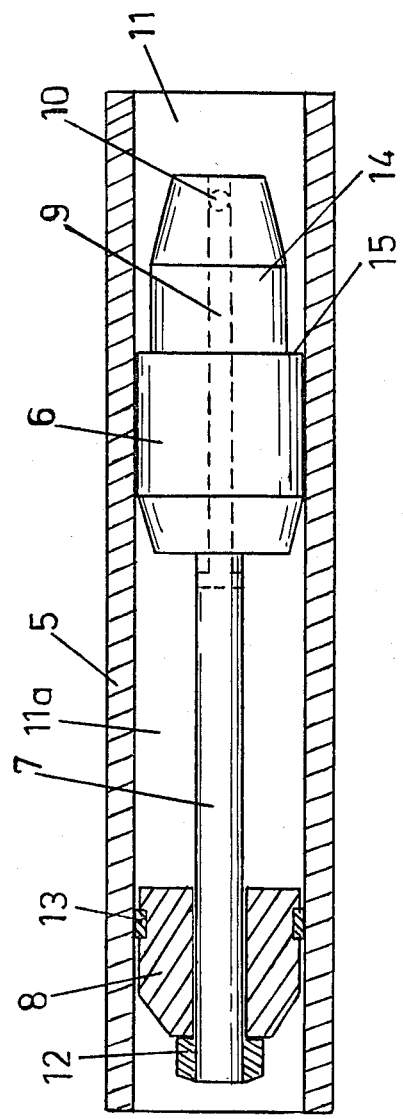
FIG. 3: Is a longitudinal section through a device in accordance with the invention.

A device in accordance with the present invention for filling these gaps 4 during the assembly of the heat exchanger is illustrated in FIG. 3. A mandrel 6 with shaft 7 on which a piston 8 can slide is situated inside a sleeve 5.

The space 11a between the mandrel 6 and piston 8 is filled with the filler material via a hole 9 in the mandrel 6 which is provided with a non-return valve 10, not shown in detail here. A stop 12 at the end of the shaft prevents the piston sliding off as the space 11a is charged with filler material.

The piston 8 is fitted with a ring 13 to provide better sealing and to alter the resistance to movement of the piston 8. The end 14 of the mandrel 6 pointing away from the piston is conical in shape to allow the tube 2 to be guided better into the stack of fins and features a stop 15 for the tube 2.

The mode of operation of the device of the invention is illustrated in FIGS. 4a–c.

In FIG. 4a the device already charged with filler material 16 is placed on the stack of fins such that the cylindrical space 11 of the device of the invention is exactly in line with the space 17 formed by the collars 3 of the fins 1.

Using the tube 2, set on the conical shaped end 14 of the mandrel 6, the unit made up of the piston 8 and mandrel 6, with filler material 16 in between, is pushed through the cylindrical space 17 in the stacked fins (FIG. 4b), and into the sleeve 5b positioned on the other side (FIG. 4c).

On pushing the unit through the fins a certain amount of pressure is exerted on the filler material 16 to overcome the resistance of the piston 8 or ring 13 to sliding, so that the filler material 16 is forced into the ring-shaped gaps 4. The mandrel 6 wipes away much of the filler material 16 on the collar 3 leaving only a very thin film there. This thin film is also pushed into the ring-shaped gaps 4 when the tubes 2 are finally expanded in place.

The unit in the sleeve 5b, as shown in FIG. 4c, after being pushed through the stack of fins, is again ready for use as in the sequence shown in FIGS. 4a–c, after it has been charged again with filler material.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for filling the ring-shaped gaps formed between the tubes and fins of a tube and fin type heat exchanger with a corrosion protective filler material comprising:
   (a) stacking said fins such that the collars of said fins form a first substantially cylindrical passage along a first axis;
   (b) matingly positioning a first hollow cylindrical body having a second cylindrical passage substantially equal in diameter to said first cylindrical passage along said first axis on one side of said stacked fins so as to form an extension of said first cylindrical passage;
   (c) sealingly locating a body having a variable volume chamber within said second cylindrical passage in said first hollow body;
   (d) charging said variable volume chamber with said corrosion protective filler material;
   (e) positioning a heat exchanger tube upstream of said body having said variable volume chamber and proximate thereto; and
   (f) pushing said heat exchanger tube against said body and into said first substantially cylindrical passage whereby said variable volume chamber gradually contacts as said body passes through said first cylindrical passage so as to force said corrosion protective filler material from said variable volume chamber and into said ring-shaped gaps.

2. A process for filling the ring-shaped gaps formed between the tubes and fins of a tube and fin type heat exchanger with a corrosion protective filler material comprising:
   (a) stacking said fins such that the collars of said fins form a first substantially cylindrical passage along a first axis;
   (b) positioning a first hollow cylindrical body having a second cylindrical passage along said first axis on one side of said stacked fins so as to form an extension of said first cylindrical passage;
   (c) locating a body having a variable volume chamber within said second cylindrical passage in said first hollow body;
   (d) charging said variable volume chamber with said corrosion protective filler material;
   (e) positioning a heat exchanger tube upstream of said body having said variable volume chamber and proximate thereto; and
   (f) pushing said heat exchanger tube against said body and into said first substantially cylindrical passage whereby said variable volume chamber gradually contacts as said body passes through said first cylindrical passage so as to force said corrosion protective filler material from said variable volume chamber and into said ring-shaped gaps.

3. The process according to claim 2 including the step of positioning a second hollow cylindrical body having a third cylindrical passage along said first axis on the other side of said stacked fins so as to form a further extension of said first cylindrical passage so as to receive said body having said variable volume chamber.

4. The process according to claim 2 further including the step of expanding said heat exchanger tube within said first substantially cylindrical passage.

5. A process for filling the ring-shaped gaps formed between the tubes and fins of a tube and fin type heat exchanger with a corrosion protective filler material comprising:
   (a) stacking said fins such that the collars of said fins form a first substantially cylindrical passage along a first axis;
   (b) sealingly locating a body having a variable volume chamber within said first cylindrical passage;
   (c) charging said variable volume chamber with said corrosion protective filler material;
   (d) positioning a heat exchanger tube upstream of said body having said variable volume chamber and proximate thereto; and
   (e) pushing said heat exchanger tube against said body and into said first substantially cylindrical passage whereby said variable volume chamber gradually contracts as said body passes through said first cylindrical passage so as to force said corrosion protective filler material from said variable volume chamber and into said ring-shaped gaps.

6. The process according to claim 5 further including the step of expanding said heat exchanger tube within said first substantially cylindrical passage.

7. The process according to claim 5 including the step of positioning a first hollow cylindrical body having a second cylindrical passage along said first axis on the other side of said stacked fins so as to form an extension of said first cylindrical passage so as to receive said body having said variable volume chamber.

* * * * *